United States Patent [19]
Bulkley

[11] 3,856,493
[45] Dec. 24, 1974

[54] ENERGY RECOVERY SYSTEM FOR OIL INJECTED SCREW COMPRESSORS

[75] Inventor: Clifford T. Bulkley, Glastonbury, Conn.

[73] Assignee: Dunham-Bush, Inc., West Hartford, Conn.

[22] Filed: May 8, 1973

[21] Appl. No.: 358,445

[52] U.S. Cl................ 62/401, 62/470, 62/428, 417/247, 418/99
[51] Int. Cl............................................. F25d 9/00
[58] Field of Search....... 62/401, 470, 84, 172, 192, 62/428; 417/243; 418/85, 97–100

[56] References Cited
UNITED STATES PATENTS
3,073,513  1/1963  Bailey.................................. 418/99
3,759,348  9/1973  Kasahara............................. 418/99

Primary Examiner—Meyer Perlin
Attorney, Agent, or Firm—Sughrue, Rothwell, Mion, Zinn & Macpeak

[57] ABSTRACT

The high heat content of the lubricating and sealing oil discharged from an oil injected screw compressor is transferred after separating the oil from the compressor discharge gas to the gas stream itself downstream of a gas aftercooler, thereby increasing the overall thermal efficiency of the system.

3 Claims, 3 Drawing Figures

3,856,493

ENERGY RECOVERY SYSTEM FOR OIL INJECTED SCREW COMPRESSORS

BACKGROUND OF THE INVENTION

1. FIELD OF THE INVENTION

This invention relates to oil injected screw compressors, and more particularly to such systems in which a lubricating and sealing fluid such as oil is separated from the compressor discharge gas and cooled prior to being recirculated to the compressor.

2. DESCRIPTION OF THE PRIOR ART

Rotary screw compressors which employ intermeshed helical screws to effect compression of air or other gas may incorporate means for injecting or otherwise supplying a lubricating and sealing fluid, normally oil, into the working chamber defined by the intermeshed screws and the compressor housing, whereby, the oil lubricates the intermeshed screws and effects sealing between the relatively moving components to increase compressor efficiency while reducing compressor operating temperatures resulting from compressing of the compressor working fluid. In such oil screw compressors, conventionally the lubricating and sealing oil is separated from the discharge gas stream and the oil is cooled prior to being recirculated to the compressor. Generally, the oil in its return path from the separator to the compressor passes through an oil cooler constituting a heat exchanger in which the heat exchange fluid may comprise water, or air, but in which case, the thermal energy of the oil resulting in passage through the compressor is lost to the system. Thus, a significant portion of the heat content of the fluid discharged from the compressor is lost, since the thermal energy content of the oil is much greater than the compressor working fluid; that is, the air or gas being compressed by the compressor. With oil as the lubricating and sealing fluid, the energy content of the oil exceeds that of the air or other gas by anywhere from three to five times, depending upon the optimum fluid compressor injection rates, that is, the amount of oil being injected in terms of the mass of the gas stream.

SUMMARY OF THE INVENTION

The present invention proposes the recovery of thermal energy normally lost by the oil or other lubricating and sealing fluid which is being continuously recirculated in a screw compressor or the like, which is separated from the discharge gas stream by an oil separator downstream of the compressor and cooled prior to re-injection into the compressor working chamber. The improvement comprises a first heat exchanger or aftercooler receiving the compressor discharge gas downstream of the oil separator for initially reducing the temperature of the oil free compressor discharge gas sufficiently to permit moisture in the discharge gas to condense and be removed by a moisture trap and a second heat exchanger operatively coupled to the oil return line, between the oil separator and the compressor, and the compressor discharge gas stream downstream of the first heat exchanger, whereby, the high heat content of the separated oil is employed to reheat the dry compressor discharge gas while effectively cooling the oil prior to its re-introduction into the compressor. Alternatively, the compressor discharge gas may be additionally cooled and moisture removed therefrom by a refrigerated dryer constituting a third heat exchanger system for the gas discharge located between the first heat exchanger and the second heat exchanger. Further, a fourth heat exchanger must be incorporated within the oil return line, between the oil separator and the screw compressor, downstream of the second heat exchanger, for the additional required cooling of the oil prior to recirculation through the screw compressor.

DESCRIPTION OF THE PREFERRED EMBODIMENT

Figures 1, 3:
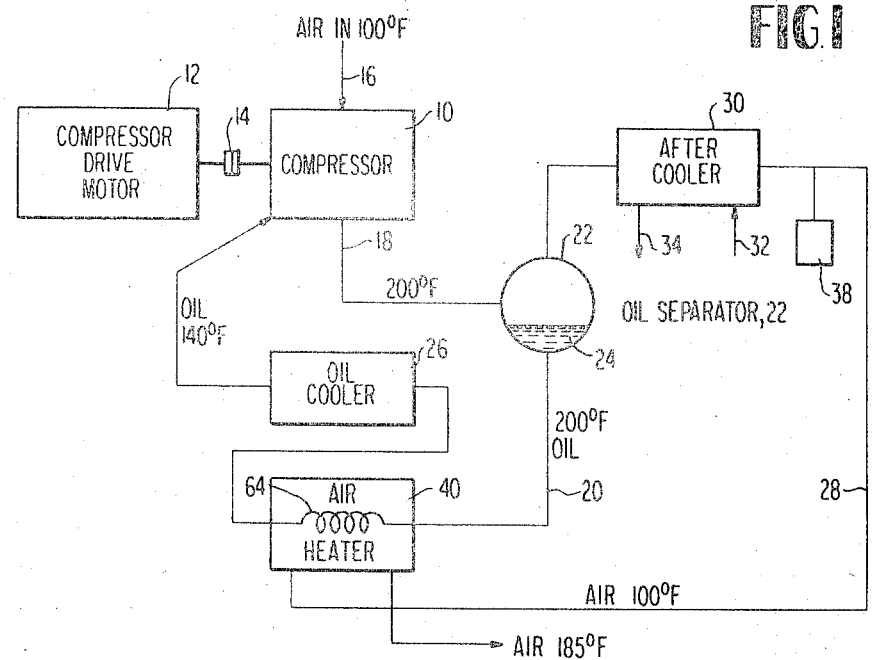
FIG. 1 is a schematic circuit of an oil dry screw compressor incorporating the heat recovery system of the present invention in one form.
FIG. 3 is a schematic representation of an oil injected screw compressor incorporating the heat recovery system of the present invention forming a modification of the system illustrated in FIG. 2.

Reference to FIG. 1 illustrates the thermal energy recovery system of the present invention as applied to an oil injected helical screw air compressor 10 which is driven by compressor drive motor 12 through mechanical coupling means 14 in conventional fashion. Air is introduced to the low side or suction side of compressor 10 via intake line 16 at approximately 100° F. and is discharged through line 18 at approximately 200° F. Oil return line 20 feeds oil under pressure to the compressor 10 for injection at relatively high pressure into the working chamber defined by the intermeshed helical screws (not shown) of the compressor, and the compressor housing performing lubricating and sealing functions. The sealing and cooling oil is therefore discharged along with the compressed air, in this case, at the same temperature, through compressor discharge line 18 to oil separator 22 for separating the oil from the compressed air. In this case, the oil 24 in settling to the bottom of the oil separator exits therefrom, through oil return line 20 for recirculation to the compressor 10.

By way of injection, separation and return, oil is continually circulated to perform the necessary lubricating and sealing functions with respect to the compressor working chamber. Conventionally, an oil cooler 26 which may be an oil-to-air heat exchanger or a water to air exchanger, is positioned within the oil return line 20 permitting injection of recirculated oil into the compressor at a temperature much lower than that exiting through line 18. The present invention is directed to recovering the high thermal energy content of the oil as it leaves the oil separator 22 and prior to re-injection into the compressor working chamber. In this respect, the compressed air or discharge gas leaves the oil separator via the compressed air feed line 28 and passes to an aftercooler 30 which is in the air feed line downstream of the oil separator. Here the air is cooled by means of the circulation of water or other coolant to and from the aftercooler 30 as indicated by arrow lines 32 and 34 respectively, such that air at a temperature of approximately 100° F. leaves the aftercooler 30 through line 28. A trap 38 may be incorporated within line 28 for trapping condensed moisture resulting from the temperature drop of the air, thus the air passing through line 28 downstream of aftercooler 30 is relatively dry. The relatively low temperature, dry air at 100° F. passes through line 28 to air heater 40 which constitutes a heat exchanger thermally coupling the oil return line 20 to the air feed line 28. This permits thermal energy to pass from the 200° F. oil within coil 64 to the 100° F. air within air discharge line 28, whereupon, the high thermal energy content of the oil effectively heats the air discharged from the compressor increasing its energy content, while dissipating some heat within the oil and reducing the load on the air-to-oil heat exchanger or oil cooler 26. As illustrated in the embodiment of FIG. 1 the high temperature oil has the capacity of increasing the heat of the compressor discharge air downstream of aftercooler 30 from 100° to 180° F. The extent to which the reheated air in line 28 approaches the exit conditions of the compressor in line 18 upstream of the oil separator 22, is directly influenced by the type and size of the oil-to-air heater 40. There is, with respect to the oil flooded screw compressor 10, always sufficient heat in the oil 24 to effect an air temperature rise in heater 40 above the aftercooler exit temperature.

Figure 2:
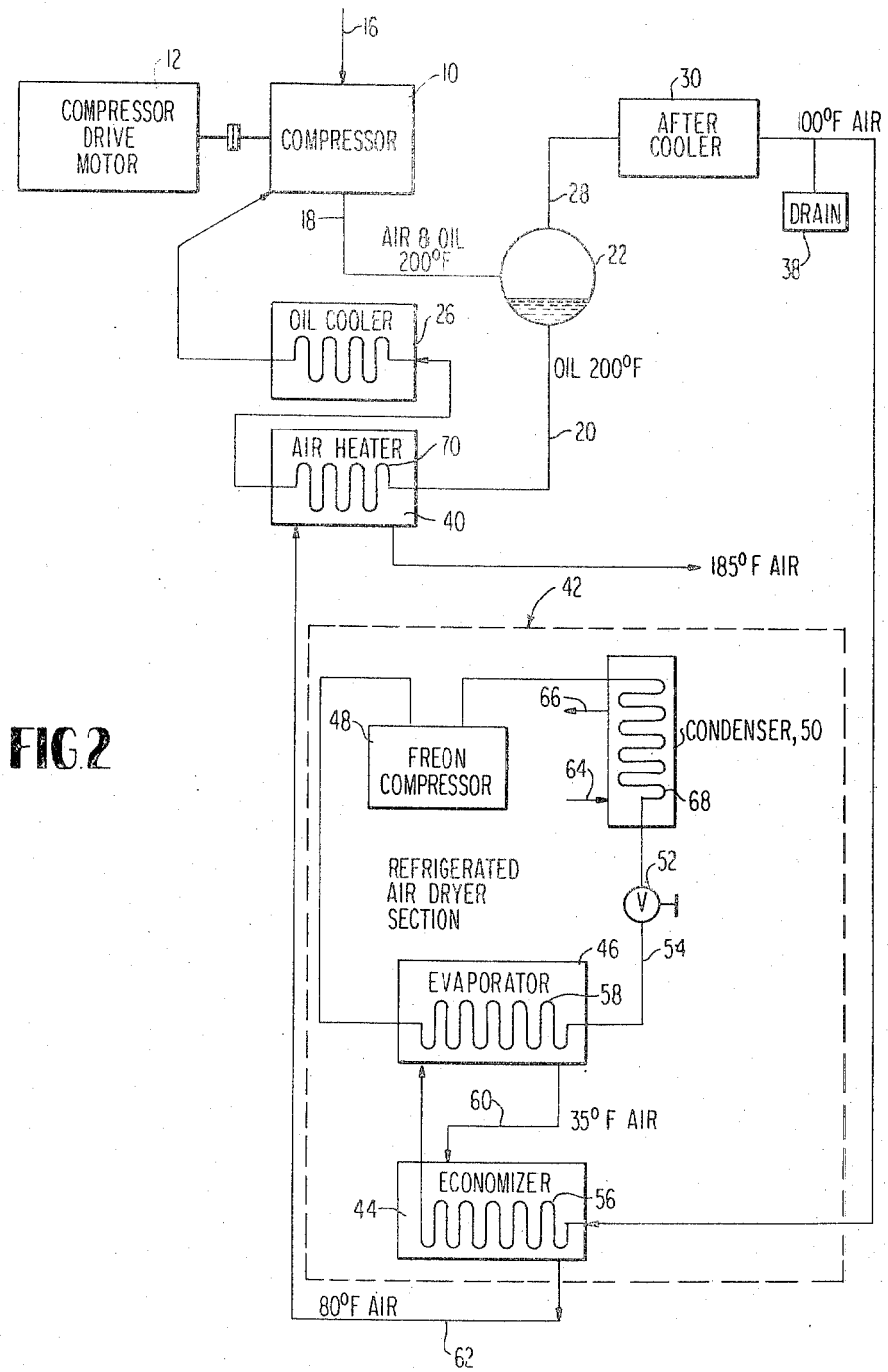
FIG. 2 is a schematic representation of an oil injected screw compressor incorporating the heat recovery arrangement of the present invention in modified form as applied to a system including a refrigerated air dryer for the compressor discharge gas.

Referring to FIG. 2, there is illustrated a second embodiment of the present invention. It is similar to the embodiment of FIG. 1 but includes additionally, a refrigerated air dryer 42 as indicated in dotted line fashion. With respect to all three illustrated embodiments of FIGS. 1, 2 and 3, like elements are given like numerical designation. In this respect, compressor 10 is driven by compressor drive motor 12 and air within intake line 16 is compressed by the helical screw compressor 10 and discharged via line 18 to oil separator 20. The oil free air leaves the oil separator through line 28 and is cooled by aftercooler 30 to approximately 100° F., and the moisture removed by the trap but instead of returning directly to the oil-to-air heater or heat exchanger 40 to permit heat recovery from the separated oil, it passes in turn first through a heat exchanger or economizer 44 and a heat exchanger 46 which constitutes the evaporator of a closed circuit refrigeration system prior to delivering the air at an 80° temperature to air heater 40. This feed line air is considerably dryer than that of the prior embodiment.

In this respect, the refrigerated air dryer 42 incorporates, in its closed loop refrigeration system, a Freon compressor 48, a condenser 50, and an expansion valve 52, which are series connected in that order to evaporator 46 via closed loop refrigeration line 54. Heat is transferred, within economizer 44, from the compressed air leaving aftercooler 30 which passes within economizer heat exchanger tubing 56 to the same air externally of tubing 56 raising the temperature of that air from 35° to 80° F. The air within tubing 56 of the economizer is thus cooler prior to entering the evaporator 46 where it contacts the outside of evaporator coil 58 where its temperature and humidity are greatly reduced. The temperature of the air drops to 35° F. prior to return via line 60 to the economizer 44 and subsequent discharge from the refrigerated air dryer 42 via line 62 to the oil-to-air heater 40. The closed loop refrigeration circuit composing elements compressor 48, condenser 50, expansion valve 52 and evaporator 46, are quite conventional, arrows 64 and 66 indicating a heat exchanger fluid entering and leaving the condenser 50, permitting condensation of the compressed refrigerant gas within the refrigeration loop in the condenser coil 68. The dry and cool air at 80° F. in leaving the refrigerated air dryer section 42 of the embodiment of FIG. 2, is reheated to 185° F. by thermal energy exchange with the oil at 200° F. which passes through tubing 70 of air heater 40. The function of the closed loop refrigeration system as an additive in this embodiment is to permit further removal of the moisture to the compressed air prior to its utilization in a given end use device (not shown). Further, in like manner to the prior embodiment, oil cooler 26 is provided within the oil return line 20 between the oil-to-air heater 40 and compressor 10. Further, a suitable moisture trap 38 is preferably incorporated into line 28 downstream of aftercooler 30 and between the aftercooler and the economizer 44 of the refrigerated air dryer 42.

Referring to FIG. 3, wherein like elements are given like numerical designations, the refrigerated air dryer section 42 consists again of a closed loop refrigeration system, wherein refrigeration compressor 48 circulates, via piping 54, a refrigerant such as Freon, in order, to condenser 50 where the compressed refrigerant gas is condensed. The liquid refrigerant is then expanded via expansion valve 52 for effecting, through the heat of expansion, heat removal within evaporator 46 from the compressed air after discharge from aftercooler 30 within line 28. This occurs prior to delivering the dry and cooled air at approximately 35° F. to the oil-to-air heater 40, whereafter, dry and heated air at approximately 185° F. is supplied to the end use device (not shown) coupled to the system downstream of heat exchanger 40. Thus, the arrangement of FIG. 3 eliminates the high cost economizer and allows the 35° F. dry air to pass directly to the air-oil heater 40 without circulation back and forth from an economizer to the evaporator of the refrigerated air dryer section. This reduces necessarily the size of the oil cooler 26 in both the embodiments of FIG. 2 and FIG. 3 but at the penalty of more refrigeration equipment. In any case, there is sufficient heat content in the oil 24 emanating from oil separator 22 to raise the temperature of the exit air from the dryer section 42 well above the 100° F. aftercooler exit temperature.

In the illustrated embodiment of FIG. 3, the oil cooler 26 may comprise an oil-to-water cooler in which water as the coolant enters heat exchanger 26 as indicated by arrow 72 and exits therefrom as indicated by arrow 74. Oil which is recirculated to the screw compressor is cooled to approximately 140° F. by passage through both heat exchangers 40 and 26 in that order prior to re-injection into screw compressor 10. Heat exchangers 40 and 26 may be connected in parallel where only a portion of the recirculated oil is used to effect a temperature rise above the 100° F. exit of the aftercooler.

While the embodiments of FIGS. 1, 2 and 3 are illustrative only of typical parameters for packaged oil injected helical screw compressors, it is apparent that varying temperature levels may be experienced depending upon compressor efficiency, oil cooler heat transfer surfaces, aftercooler surfaces, oil flow rates and pressure drop losses within the system. However, the temperature levels indicated in the drawings are typical.

As an example illustrating in general the efficiency and amount of heat recovery possible employing the present invention in such oil flooded screw compressor systems, it has been shown that 23 horsepower is required to compress 100 cubic feet per minute flow of free air discharged at a pressure of 100 psig within line 28 downstream of aftercooler 30. With driver efficiency neglected, the weight flow amounts to 7.1 pounds per 100 cubic feet, per minute. With heat input to the compressor per pound of air being 138 btu, heat gained by the air with a 100° F. temperature rise amounts to 24 btu per pound. The difference represents the heat gained by the oil which absorbs a major portion of the heat during compressor operation, this amount being 114 btu per pound. Thus, 82.5 percent of the heat input to the air and the oil acting as the lubricant and seal for the compressor is retained by the oil 24 which is available for transfer back to the compressor discharge air downstream of the cooler 30 in the embodiment of FIG. 1, or downstream of both the aftercooler 30 and the dryer 42 in the embodiments of FIGS. 2 and 3. The effective surfaces area within the oil to air heater 40 permits a 15° F. temperature difference as a practical minimum, thus, the compressor discharge air within feed line 28 leaving aftercooler 30 and heated in FIG. 1, from 100° F. to approximately 185° F. provides a 14.8 percent improvement over the energy level at the aftercooler exit.

A further improvement under the system of the present invention may be realized when air from the refrigerated dryer of FIG. 2 is reheated in this manner. During cold weather operation of a water cooled aftercooler, where water temperatures are low, the resulting exit air temperature in line 28 downstream of aftercooler 30 may reach a temperature as low as 55° F. Reheating this colder air through the use of the air-to-oil heater 40 improves the thermal efficiency of the system and may in fact reduce altogether, the need for dryer 42.

Through use of the present invention, the thermal efficiency of an oil flooded screw compressor is considerably enhanced by transferring the heat from the oil to the air leaving an aftercooler or dryer or both. This increase or improvement in thermal efficiency may be achieved regardless of whether the oil-to-air heater such as 40 is coupled in series or parallel with a conventional water or air cooled oil cooler intermediate of the oil separator and the compressor within the oil return line. The improvement in thermal efficiency as a result of the presence of the oil-to-air heater may be sufficiently high to overcome the energy losses normally encountered as a result of loss of system pressure through the aftercooler and/or dryer, even when combined with the pressure drop losses of the air-to-oil heater 40. Further, the compressed air prior to delivery to an end use device, in leaving the aftercooler and reheated by the air to oil heater 40 will have a resulting lower relative humidity, thus reducing condensation in air lines which might otherwise occur. The employment of the oil-to-air heater 40 permits the normal water or air cooled oil cooler 26 within the oil return line to be made proportionately smaller due to the amount of heat transferred by the oil to the air within heater 40. Further, systems as previously described which incorporate a refrigerated air dryer such as dryer 42 can permit discontinuance of operation of the dryer for those dew point conditions above 50° to 55° F. Further, the power input to the compressor may be reduced in amounts proportional to the energy gained, resulting from heat in the air leaving the aftercooler.

What is claimed is:

1. In an air compressor system for delivering compressed air at relatively high temperature and moisture free to a load downstream of said compressor, and wherein said air compressor has a working chamber subjected to a lubricating and sealing oil with a large amount of the heat of compression of the air being absorbed by the oil in comparison with that retained by the air and wherein said system includes an oil separator which receives the compressor discharge and separates the oil from the compressed air for recirculation of the oil via nan oil return line to the compressor working chamber, and wherein a first heat exchanger is fluid coupled to the oil sump and receives the oil free compressor discharge air and cools the compressed air to effect condensation and includes a trap for removal of the moisture within the compressor discharge air prior to delivery of the moisture free compressed air to an end use device, the improvement comprising:

a second heat exchanger thermally coupling said oil within said return line between said oil separator and the air compressor working chamber to the oil free, moisture free compressed discharge air downstream of the first heat exchanger for returning the heat lost to the compressed discharge air at the first heat exchanger to the moisture free compressed air from the separated oil, thereby increasing the overall thermal efficiency of the system.

2. The gas compressor system as claimed in claim 1, further including: a refrigerated dryer in heat exchange relationship with the compressor discharge air downstream of the first heat exchanger and trap and upstream of the second heat exchanger for further reducing the moisture content of the compressed air prior to reheating of the same by said second heat exchanger.

3. The gas compressor system as claimed in claim 2, further comprising: an economizer and wherein said refrigerated dryer comprises a closed loop refrigeration system including a compressor, a condenser, and an evaporator, in that order, and means for circulating a refrigerant therebetween under control of a thermal expansion valve upstream of the evaporator, and said economizer comprises an air to air heat exchanger fluid coupling said compressor discharge air downstream of said first heat exchanger to itself after heat exchange with said evaporator and prior to delivering said compressor discharge to said second heat exchanger.

* * * * *

Disclaimer 3,856,493.—*Clifford T. Bulkley*, Glastonbury, Conn. ENERGY RECOVERY SYSTEM FOR OIL INJECTED SCREW COMPRESSORS. Patent dated Dec. 24, 1974. Disclaimer filed Apr. 10, 1975, by the assignee, *Dunham-Bush, Inc.*

Hereby enters this disclaimer to claim 1 of said patent.

[*Official Gazette July 15, 1975.*]